Oct. 25, 1960   H. L. ARMIGER   2,957,590
CONVEYOR CARRIERS
Filed April 4, 1958   3 Sheets-Sheet 1

INVENTOR.
HARRY L. ARMIGER
BY
ATTORNEY

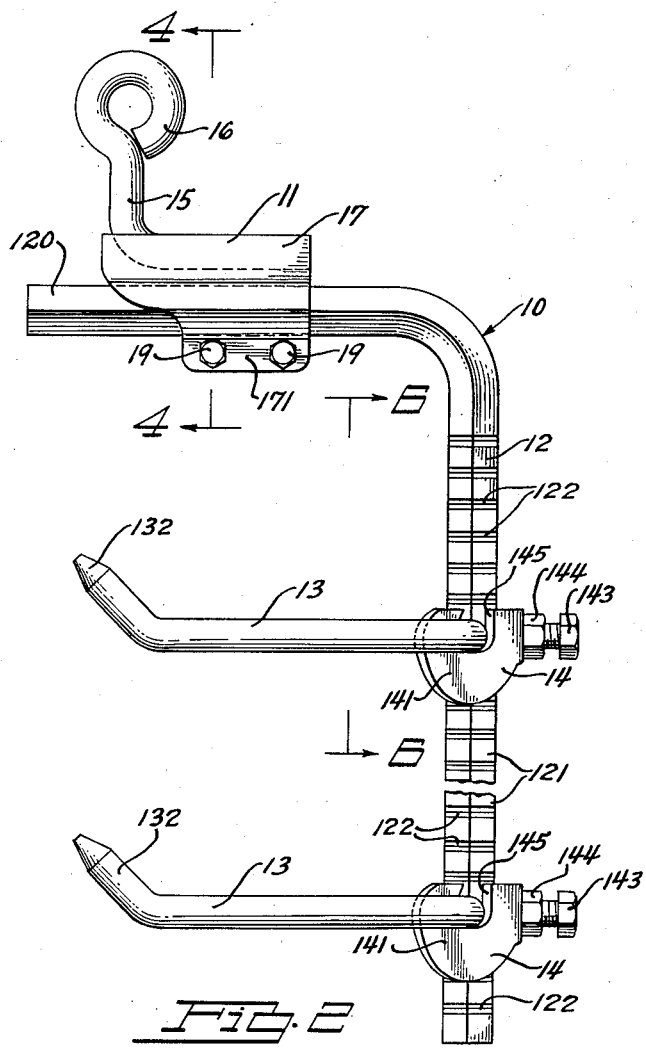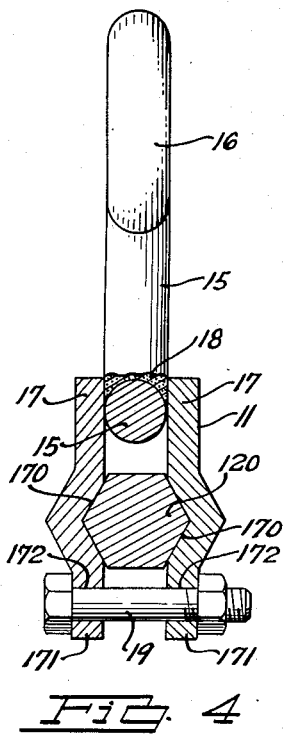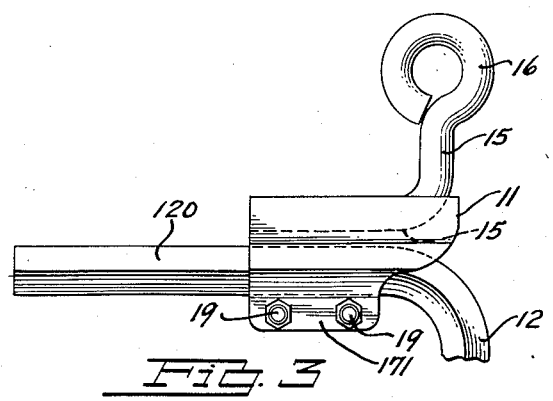

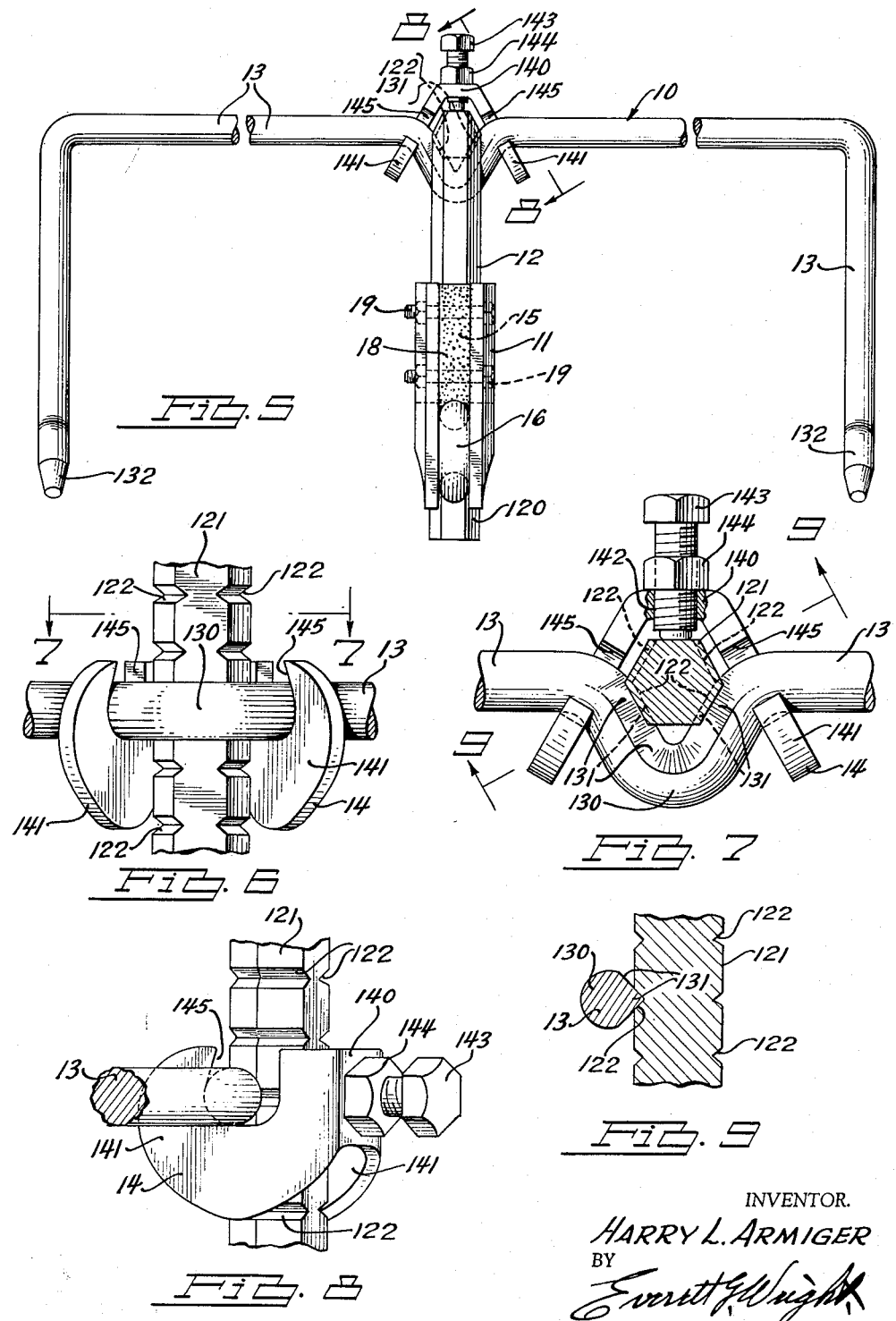

United States Patent Office 2,957,590
Patented Oct. 25, 1960

2,957,590
CONVEYOR CARRIERS
Harry L. Armiger, 24800 Edgemont, Birmingham, Mich.
Filed Apr. 4, 1958, Ser. No. 726,429
2 Claims. (Cl. 211—176)

This invention relates to conveyor carriers for overhead conveyors, and in particular to an improved universal conveyor carrier which may be readily adapted to receive and carry various sizes and shapes of production parts from one production operation to another or to assembly lines, the parts carried thereby being completely accessible and easily removed therefrom.

In the change-over of a modern plant from the production of one item to another or from the production of one model of a product to another, the conveyors carrying parts from one area or machine to another or from parts banks to an assembly line must be relocated to conform with the new production layout, and the conveyor hangers must be changed to accommodate the different parts to be carried thereby. This changing of conveyor hangers occasioned by production change-overs is an extremely costly item in many manufacturing plants. In many instances, conveyor hangers are completely scrapped and replaced with new ones, or, when the conveyor hangers are revamped to accommodate them to carrying different parts, the making of the necessary changes in the conveyor hangers is extremely costly. Furthermore, production change-overs necessarily must be accomplished within a short period of time which ofttimes dictates the policy of scrapping conveyor hangers and purchasing new ones rather than revamping the old conveyor hangers.

With the foregoing in view, the primary object of the invention is to provide an improved and simplified conveyor hanger which is readily adjustable to accommodate parts of different sizes and configurations.

Another object of the invention is to provide an improved conveyor carrier including a coupling element, a main hanger rod depending from said coupling element, and clamp means adapted to support parts hanger rods at selected intervals and attitudes along the main hanger rod, the said parts hanger rods being replaceable by like parts hanger rods of different lengths and configurations whereby to accommodate the conveyor hanger to use for conveying a wide variety of sizes and shapes of production parts or the like.

A further object of the invention is to provide a conveyor hanger of the above mentioned type including a reversible coupling element for use in coupling the conveyor hanger to an overhead conveyor, which coupling element receives and supports the main conveyor hanger rod in a plurality of selected offset locations whereby proper balance of the conveyor hanger for carrying various items may be readily attained.

Other objects of the invention will become obvious by reference to the following detailed description taken in connection with the accompanying drawings, in which:

Fig. 2 is a side elevational view.

Fig. 3 is a fragmentary side elevational view showing the coupling element of the conveyor hanger and the main hanger rod disposed in opposite relationship to that shown in Fig. 2.

Fig. 4 is an enlarged cross sectional view taken on the line 4—4 of Fig. 2.

Fig. 5 is a top plan view of the conveyor hanger construction disclosed in Fig. 1.

Fig. 6 is an enlarged front elevational view taken on the line 6—6 of Fig. 2 showing the clamp means employed to removably connect parts hanger rods to the main hanger rod.

Fig. 7 is a horizontal sectional view taken on the line 7—7 of Fig. 6.

Fig. 8 is an enlarged diagonal elevational view taken on the line 8—8 of Fig. 5.

Fig. 9 is a sectional view taken on the line 9—9 of Fig. 7 showing the preferred formation of the parts hanger rod at the anchorage loop thereof and how it dovetails with the notched main hanger rod.

Figure 1:
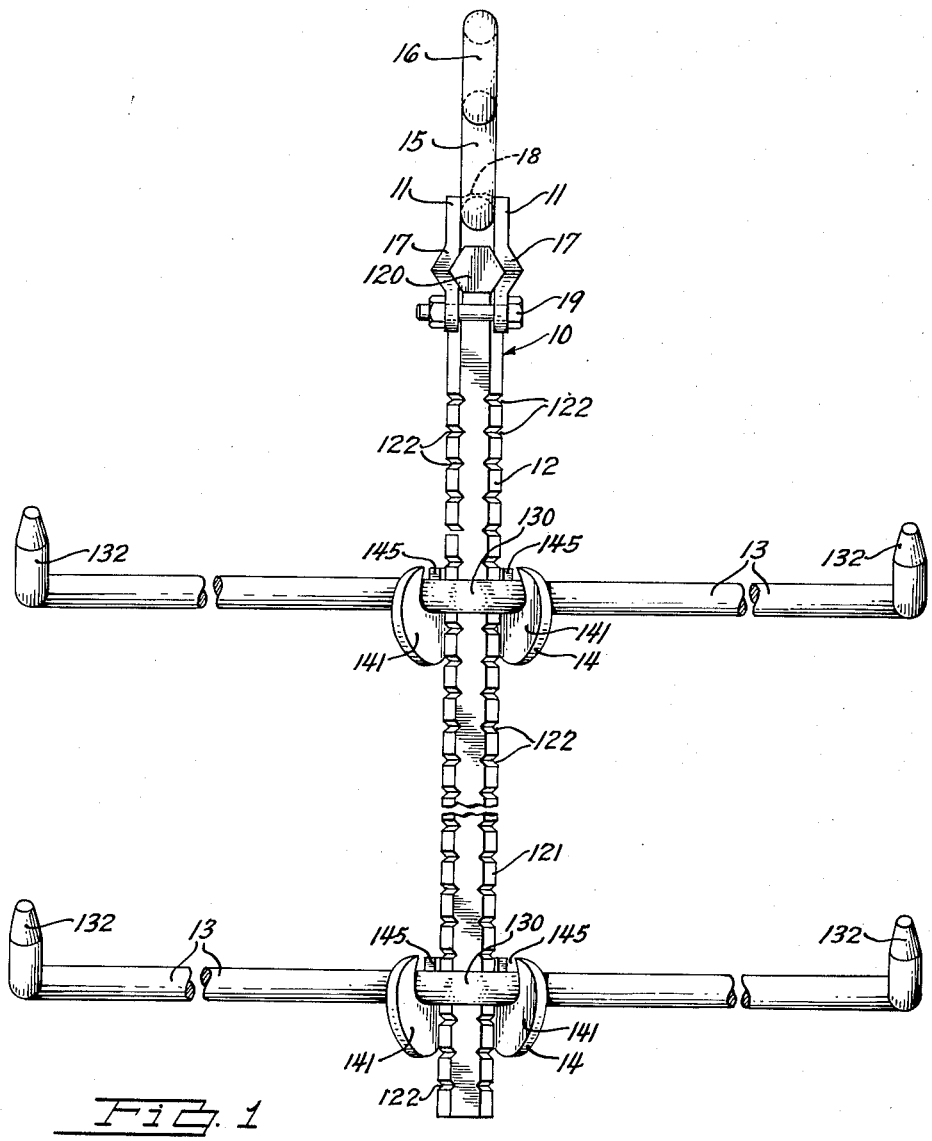
Fig. 1 is a front elevational view of an improved conveyor hanger embodying the invention.

Referring now to the drawings wherein like reference numerals refer to like and corresponding parts throughout the several views, the particular embodiment of the invention disclosed for illustrative purposes comprises a conveyor carrier generally designated by the numeral 10 consisting of a coupling element 11 by means of which the conveyor carrier 10 is suspended from a roller conveyor, chain conveyor or the like, a main hanger rod 12 removably fixed in a longitudinally adjustable depending relationship from the said coupling element 11, and one or more parts hanger rods 13 of the desired or required length and configuration removably secured at selected intervals along the depending main hanger rod 12 by improved clamp means 14. Each clamp means 14 engages both the main hanger rod 12 and a parts hanger rod 13 holding them securely in interlocking engagement whereby to prevent any movement whatsoever in any direction therebetween. The said interlocking clamp means 14 is easily releasable and re-securable to permit ready relocation of parts hanger rods 13 along the main hanger rod 12 or the substitution of like parts hanger rods of different arm lengths and/or having different arm configurations.

The coupling element 11 of the improved conveyor carrier 10 preferably consists of an L-shaped rod 15 having an eye 16 or other formation at the top of the vertical leg thereof by means of which the coupling element 11 may be secured to a roller or chain or other conveyor means, not shown. A pair of clamp plates 17 are welded in depending relationship from the horizontal leg of the said L-shaped rod 15 by welds 18 preferably located at the top thereof. The said clamp plates 17 are provided with opposite longitudinally disposed angular formations or grooves 170 therein and are suitably spaced to telescopingly receive the upper horizontal portion 120 of the main hanger rod 12 which is preferably hexagonal in cross section. Below the angular formations 170 of the said clamp plates 17 are depending flanges 171 apertured at 172 to accommodate clamp bolts 19, all as best shown in Figs. 1–4 inclusive. The coupling element 11 is thusly formed to telescopingly receive the upper horizontal end 120 of the hexagonal main hanger rod 12 and clamp it to any position to which it may be telescoped therein. This provides means for disposing the parts hanger rods 13 in the desired balanced relationship in respect to the conveyor carrier 10 about the eye 16 or other means by which the said conveyor carrier 10 may be secured to its conveyor means.

The main hanger rod 12 is preferably hexagonal in cross section and is shown bent to an inverted L-shape, although it may be formed to other shapes where the particular conveyor installation may require. The said inverted L-shaped main hanger rod 12 has a relatively short upper horizontal portion 120 and a longer depending vertical portion 121. The said depending vertical portion 121 of the said main hanger rod 12 is provided with a plurality of longitudinally spaced V-notches 122 therein located at least at two adjacent sides of the hexagonal main hanger rod 12 on opposite sides thereof, although the said V-notches 122 may extend completely around the said main hanger rod 12 if desired. Pairs of angularly related V-notches 122 accommodate and locate the parts hanger rods 13 which are removably fixed in place by the clamp means 14.

The parts hanger rods 13 are preferably round rods provided with a horizontal V-shaped anchorage loop 130 therein formed with an angularly related pair of horizontal wedge shaped teeth 131 which are disposed to dovetail into a pair of like angularly related V-notches 122 provided in the vertical portion of the main hanger rod 12. By selecting which pair of V-notches 122 of the main hanger rod 12 into which to dovetail the wedge shaped teeth 131 of the V-shaped anchorage loop 130 of the parts hanger rod 13, the vertical spacing and horizontal angular disposition of each of the parts hanger rods 13 with respect to the main hanger rod 12 may be established. The ends of the parts hanger rods 13 may be suitably formed as at 132 to receive and retain a part or item to be carried thereby. Although not shown in the drawings, it is obvious that other parts hanger rods of different form and configuration having a V-shaped anchorage loop 130 formed as hereinbefore described may be substituted for the parts hanger rods 13 whereby to accommodate the conveyor carrier to receive and carry parts and items of vaious sizes and configurations in the desired attitude in respect to the main hanger rod 12.

The clamp means 14 preferably consists of a vertically disposed V-shaped stamping or casting having a vertical back 140 and a pair of divergent arms 141. The vertical back 140 is horizontally bored and threaded at 142 as shown in Fig. 7 to accommodate a locking stud 143 onto which is threaded a lock nut 144. The divergent arms 141 are vertically notched at 145 to receive a parts hanger rod 13 adjacent the outside of the V-shaped anchorage loop 130 therein.

In assembling a parts hanger rod 13 to the main hanger rod 12 at a selected location therealong, the parts hanger rod 13 and the clamp means 14 with its locking stud extending out sufficiently to clear the main hanger rod 12 are hooked together with the parts hanger rod 13 engaged loosely within the notches 145 of the divergent arms 141 of the said clamp means 14. The wedge shaped teeth 131 of the parts hanger rod 13 are positioned in the selected complementary V-notches 122 of the main hanger rod 12, and then the locking stud 143 is tightened and the lock nut 144 is set. Thusly, a parts hanger rod 13 may be removably fixed in any selected vertical or selected angular relationship to the main hanger rod 12 within the limits permitted by the V-notches 122 and the shape of the main hanger rod 12. The main hanger rod 12 may be a cross section other than hexagonal, although the hexagonal cross section is preferable in most installations and provides a reasonable selection of angular relationships between the disposition of the parts hanger rods 13 with respect to the main hanger rod 12.

If the main hanger rod 12 is only provided with V-notches 122 on the four opposite sides thereof as shown in the drawings, then, the parts hanger rods 130 may only be clamped in a selected 180 degree relationship with respect to each other. If the V-notches 122 extend on all sides of the main hanger rod 12, then, the parts hanger rods 130 may be clamped in any selected 60 degree angle around the said main hanger rod 12.

With the foregoing construction, a great variety of sizes and shapes of parts hanger rods having a V-shaped anchorage loop with wedge shaped teeth may be substituted for the symmetrical horizontally disposed parts hanger rod 13 shown throughout the drawings and they may be disposed at various selected angular relationships with respect to the direction of travel of the conveyor with which the improved conveyor carrier is employed. Thusly, with a very little expense, conveyor systems equipped with conveyor carriers 10 embodying the invention may be adapted to carrying many different parts of various sizes and configurations at convenient attitudes and in proper balance.

Although but a single embodiment of the invention has been disclosed and described in detail, it is obvious that many changes may be made in the size, shape, arrangement and detail of the various elements of the invention, all without departing from the spirit and scope of the invention as defined by the appended claims.

I claim:

1. A conveyor carrier comprising a main hanger rod polygonal in cross section and horizontally V-notched at selected adjacent sides thereof at intervals therealong presenting angularly related V-notched sides, parts hanger rods each including a V-shaped anchorage portion with wedge shaped teeth disposed in an angular relationship complementary to said adjacent V-notches in said main hanger rod and adapted to dovetail therein, and clamp means formed to engage said parts hanger rods adjacent the V-shaped anchorage portion thereof including means for removably fixing said parts hanger rods in dovetailed rigid assembled relationship at selected notched longitudinal locations along said main hanger rod and at selected angular relationships at said selected locations.

2. A conveyor carrier comprising a depending main hanger rod polygonal in cross section and horizontally V-notched at selected adjacent sides at intervals therealong presenting angularly related V-notched sides, parts hanger rods each including a V-shaped anchorage portion with wedge shaped teeth disposed in an angular relationship complementary to said adjacent V-notches in said main hanger rod and adapted to dovetail therein, and clamp means including a back portion and divergent vertically notched arms adapted to engage said parts hanger rods adjacent the V-shaped anchorage portion thereof, and an anchorage stud threaded through said back portion of said clamp means for removably fixing said parts hanger rods in dovetailed rigid assembled relationship at selected longitudinal notched locations along said main hanger rod and at notched selected angular relationships at said selected locations.

References Cited in the file of this patent

UNITED STATES PATENTS

| 336,123 | Leggitt | Feb. 16, 1886 |
|---|---|---|
| 382,542 | McElroy | May 8, 1888 |
| 542,114 | Shupert | July 2, 1895 |
| 629,105 | Fitzgerald | July 18, 1899 |
| 1,854,478 | Meyers | Apr. 19, 1942 |
| 2,541,597 | Midling | Feb. 13, 1951 |
| 2,858,265 | Schneider | Oct. 28, 1958 |
| 2,858,266 | Schneider | Oct. 28, 1958 |